United States Patent [19]

Elbaum et al.

[11] 4,319,331

[45] Mar. 9, 1982

[54] CURVE FOLLOWER

[75] Inventors: Charles Elbaum; Leon N. Cooper, both of Providence, R.I.

[73] Assignee: Nestor Associates, Stonington, Conn.

[21] Appl. No.: 116,034

[22] Filed: Jan. 28, 1980

[51] Int. Cl.³ ............................................. G08C 21/00
[52] U.S. Cl. ..................................... 364/515; 178/19; 250/202; 364/518
[58] Field of Search ................................ 364/515–520, 364/719; 178/15, 18, 19; 250/202; 340/146.3

[56] References Cited

U.S. PATENT DOCUMENTS

| | | | |
|---|---|---|---|
| 2,682,043 | 6/1954 | Fitch | 178/15 X |
| 3,229,100 | 1/1966 | Greanias | 250/202 |
| 3,303,465 | 2/1967 | Essinger et al. | 340/146.3 |
| 3,603,931 | 9/1971 | Britt et al. | 340/146.3 |
| 3,921,165 | 11/1975 | Dym | 178/18 X |
| 3,925,760 | 12/1975 | Mason et al. | 340/146.3 |
| 4,117,324 | 9/1978 | Francke | 250/202 |
| 4,143,401 | 3/1979 | Coviello | 364/515 X |
| 4,163,286 | 7/1979 | Reins et al. | 364/719 |
| 4,181,952 | 1/1980 | Casey et al. | 364/515 |
| 4,206,314 | 6/1980 | Prugh et al. | 178/19 |
| 4,210,775 | 7/1980 | Rodgers et al. | 178/19 |
| 4,213,005 | 7/1980 | Cameron | 178/19 |
| 4,260,852 | 4/1981 | Fencl | 178/19 |

Primary Examiner—Felix D. Gruber
Attorney, Agent, or Firm—Karl F. Milde, Jr.

[57] ABSTRACT

A curve follower or line tracing system for converting the common representation of patterns of lines into features which are readily usable as inputs to an adaptive information processing system such as a Nestor adaptive module. The problem addressed by this system is how to sequentially identify, from a global exposure or tracing of a curve, the starting and subsequent points of the curve in the same manner as tracing it by hand. In the curve follower, an array of light sensitive elements located on a grid identify a line at the grid points. Since the end point of the line has a single neighbor, it is readily located. The identification of an end point is used to subsequently inhibit further identification of the end point and create another point which is similar identified. Overall biases may be employed to define a preferred line direction. Once the resulting sequence is obtained, the line may be coded.

26 Claims, 5 Drawing Figures

CURVE FOLLOWER

BACKGROUND OF THE INVENTION

The present invention relates to a method and apparatus for tracing or following lines defining patterns on information-bearing media so as to "read" such patterns and provide usable input to an information processing system.

More particularly, the present invention relates to a method and apparatus which facilitates the automatic reading of two or three dimensional patterns, such as alpha-numeric characters, function curves and the like, which may be hand written, typed, printed or otherwise recorded on information-bearing media.

The purpose of such method and apparatus is to convert such patterns into signals which are readily usable as inputs to an information processing system.

Information-bearing media, of the type referred to above, may consist of "sheets" containing "line" information. It will be understood that such media are not limited to "sheets" in the common everyday sense of sheets of paper, since readable information may be rendered on the surface of any suitable structure. Furthermore, it is to be understood that a "line" may include or define a pattern such as an alphabetic or numeric character, a design or drawing of any arbitrary or familiar nature.

The art is replete with different types of apparatus, evolved over several decades, for reading and recognizing information, ranging from simple, template comparison devices to more recent sophisticated optical scanning systems for electronically converting written information into digital data that then may be transmitted, decoded, processed and reproduced. The present invention relates to devices in the latter category, although its principles of operation are not limited to "optical" scanning. The invention is equally applicable to the reading of magnetically recorded media as well as other information-bearing media on which the recorded information is not visible.

The present invention, however, is primarily concerned with a method and apparatus of the type that accepts and scans sheets of paper or other material which carry visible patterns located somewhere within a prescribed field of vision. The apparatus locates the patterns and produces a digital output for application to an information processing system such as a programmed general purpose digital computer or an "adaptive" information processing system.

Adaptive information processing systems have received significant interest over the years and a considerable amount of prior art has developed which includes the U.S. Pat. No. 3,287,649 to Rosenblatt, U.S. Pat. No. 3,408,627 to Kettler, U.S. Pat. No. 3,435,422 to Gerhardt et al, U.S. Pat. No. 3,533,072 to Clapper and the U.S. Pat. No. 3,601,811 to Yoshino. Of particular interest are the commonly-owned U.S. Pat. Nos. 3,950,733 and 4,044,243 to Cooper and Elbaum.

The Cooper and Elbaum patents disclose the so-called Nestor TM adaptive module which operates to map an input signal into an output response in accordance with a particular algorithm. When operating in a "learning mode" the Nestor adaptive module modifies itself to both "learn" and "forget" at desired rates. When operating in a "memory mode" the module neither learns nor forgets but functions as a pure distributed memory. The apparatus according to the present invention preprocesses signals which may be applied as inputs to such a module.

Various techniques have been used in the past for "reading" lines or patterns on an information-bearing sheet. The U.S. Pat. Nos. 3,603,931 to Britt, 3,303,465 to Essinger et al and 2,682,043 to Fitch disclose various techniques for detecting pattern information overlayed onto a grid. These references are typical of a large body of art which locates points on the grid on which a pattern is present either by direct "bit mapping" of all or a number of points on the grid simultaneously or by scanning the grid, line by line, in the manner of a television raster. None of these references discloses a device which is capable of directly reading or following a line or pattern in a progessive, orderly manner so as to provide information to an information processing system which may be recognized with a minimum of processing.

SUMMARY OF THE INVENTION

It is an object of the present invention to provide a method and apparatus for tracing or following a curve or line, as may be found in an alphanumeric character or other pattern, in the same spirit as tracing it by hand, and providing a sequential signal representation of successive points along the line in a prescribed coordinate system.

This object, as well as other objects which will become apparent in the discussion as follows are achieved, according to the present invention, by providing a method and apparatus for sensing the presence or absence of the line on a grid of spaced and distributed coordinate points within the coordinate system, identifying the coordinate points of an end of the line within the grid and repeatedly inhibiting identification of the previously identified coordinate point of the end of the line thereby to define a new end of the line. In this way the succession of inhibited coordinate points specifies the sequential path of the line along the grid from the originally identified end to the opposite end.

Preferably, the grid which is superimposed on the line to be traced defines a two dimensional Cartesian coordinate system. The coordinate points within the grid are preferably spaced a distance in the range of 0.1 to 1 mm, or approximately 0.5 mm, to properly identify or follow a line which is 1 to 2 mm wide.

The apparatus preferably produces signals representing the successive coordinate points along the line in sequential order. The representation may be made by providing a signal on one of a plurality of wires, with each wire associated with one coordinate point. In the alternative, the representation may be made by signals on a plurality of wires, the presence or absence of the signals providing in coded form the address of the coordinate point. These signals may be presented to a memory for recording in either sequential or some other order, or presented directly to a Nestor adaptive module.

According to a particular feature of the present invention, one of the two end points of the line is initially selected thereby defining a starting and ending point for the tracing out of the line. This may be accomplished by "biasing" the grid to provide preferred selection in one or two directions.

According to another particular feature of the present invention, the end point of a line is identified when one or the other of the following conditions exists:

(1) The line is present at only one adjacent coordinate point to the identified coordinate point; or
(2) the line is present at two or more adjacent coordinate points; however, these coordinate points are adjacent to each other.

It may be seen that an identified coordinate point at which a line is present is clearly not the end point of the line if the line is also present at coordinate points on opposite sides thereof.

Further objects, features and advantages of the present invention will become apparent from the following detailed description when taken in conjunction with the accompanying drawings.

DESCRIPTION OF THE PREFERRED EMBODIMENTS

Figure 1:
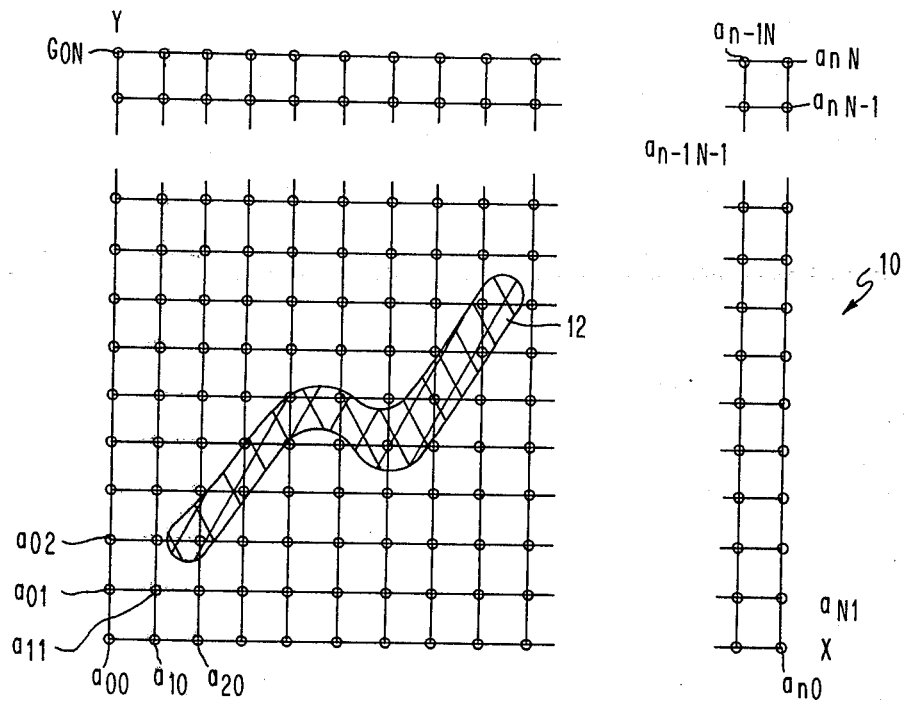
FIG. 1 shows an arbitrary curve or line superimposed on a two dimensional Cartesian coordinate grid.

The preferred embodiments of the present invention will now be described with reference to the various figures of the drawings. Identical elements in these figures are designated with the same reference numerals.

FIG. 1 shows a portion of a grid 10 superimposed on an arbitrary line or curve 12. The grid is defined by a two dimensional Cartesian coordinate system having X and Y axes and defining spaced, distributed coordinate points $a_{00}, a_{10}, a_{20}, \ldots a_{N0}, a_{11}, \ldots a_{N1}, \ldots a_{ij}, \ldots a_{0n}, a_{1n}, a_{2n}, \ldots a_{Nn}$.

Each coordinate point $a_{ij}$ is provided with a suitable sensor element to sense whether the line at that point is present or absent. For example, if the line is drawn in ink on a white background, the sensors may be light sensitive elements such as photodiodes. A separate light source may be necessary so that the light sensitive elements adjacent to the white background are activated. It will be understood that other types of sensors, such as magnetic, resistive or pressure sensitive sensors may also be used to sense the presence of a line.

It will also be understood that the grid need not be two dimensional nor must it define a Cartesian coordinate system. Three dimensional grids may be constructed to sense lines in space and other coordinate systems such as polar coordinates may be used.

Since the average line drawn on a sheet is one to two millimeters in width, the spacing between coordinate points on the grid is preferably in the range of 0.1 to 1 mm.

Too small a spacing increases the difficulty in defining end points of the line whereas too large a spacing will cause a continuous line to appear as a broken line.

Figure 2:
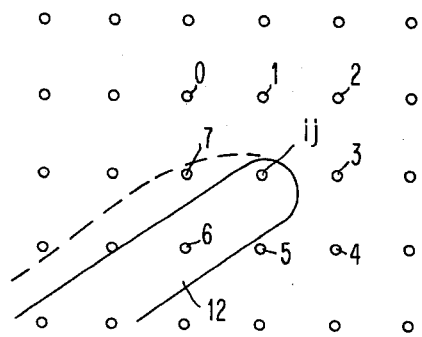
FIG. 2 is a schematic representation of sensor elements in a grid formation and illustrates the identification of an end point of a line.

FIG. 2 shows a number of sensor elements spaced in the manner illustrated in FIG. 1. As will be noted, the sensor element ij is surrounded by eight other elements numbered 0 through 7. In this illustration, the line 12 terminates at the element ij; depending upon the size and position of the line 12, one or two sensor elements adjacent to the element ij will detect the presence of the line. In the illustration, the sensor element 6 detects the presence of the line. If the line is wider as shown by the dashes, the sensor elements 6 and 7 will detect its presence. Obviously, if the line were to extend across the portion of the grid shown in FIG. 2, without terminating at the sensor element ij, the sensor element 2 and possibly the sensor element 1 would also detect its presence. FIG. 2 thus illustrates the rules for identifying an end point of the line 12:

(1) If only one sensor element surrounding a given element ij detects the presence of a line, the line terminates at the element ij.

(2) If two or more sensor elements surrounding a given element ij detect the presence of a line, the line terminates at the element ij if the surrounding elements detecting the line are adjacent to each other.

Figure 3:
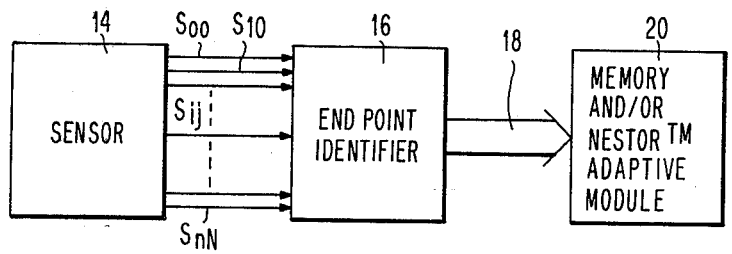
FIG. 3 is a block diagram of the apparatus according to the present invention.

FIG. 3 shows the general structure of the apparatus according the the present invention. The apparatus includes sensing means 14 which operates to determine whether a line is present or absent on a grid of spaced and distributed coordinate points as shown in FIG. 1. The sensor elements at each of the coordinate points produces a signal S so that, in a two dimensional array of elements, there will be a plurality of signals $S_{00}, S_{10}, S_{20}, \ldots S_{ij}, \ldots S_{nN}$. A signal is present on each of these lines when the respective sensor element determines the presence of a line. If photodiodes are used as sensor elements, for example, the signal may have to be inverted to indicate the presence, rather than the absence of the line.

The signals $S_{ij}$ are passed to an end point identifier 16 which repeatedly identifies coordinate points of the ends of the line within the grid. This may be accomplished with the rules stated above. Furthermore, this device 16 includes means for repeatedly inhibiting identification of the previously identified coordinate points of the ends of the line, so that a new end of the line is successively defined. In this way, a sequence of coordinate points are identified as locating the successive ends of the line. As each coordinate point is identified, its identification is suppressed so that the line is traced, point by point, from one end to the other. Each time a coordinate point is identified, a signal representing that coordinate point is presented on plural output lines 18. The signal at this output may be passed to a memory or to a Nestor adaptive module 20 for processing. The coordinate points represented by the successive signals at the output 18 may be stored in memory at successive memory addresses.

It will be understood that the lines 18 may comprise a plurality of wires on which signals representing coordinate points are transmitted in parallel. More specifically, the lines 18 may comprise just a few wires if the identity of each coordinate point is represented in encoded form, or they may comprise a number of wires equal to the number of inputs $S_{00}, \ldots S_{ij}, \ldots S_{nN}$, wherein the identity of a coordinate point is represented as a signal on only one of these wires.

The apparatus shown in FIG. 3 operates to preprocess the pattern recognition information in such a way as to make subsequent processing more orderly and convenient. Normally, subsequent processing will consist of identifying or calculating a variety of characteristics, for example:

(1) Sequential location of extrema relative to fixed coordinate axes or relative to some reference within the pattern itself;

(2) Curvature magnitudes, signs and sequences;

(3) Magnitudes, signs and sequences of angles; and, (4) Order of occurence of any and all of the above.

These characteristics should be substantially independent, for any given class of patterns, of the location and size of the pattern. The frequency in which these features occur may be especially significant. It is important, therefore, to be able to "trace" or "follow" a two dimensional pattern in a manner that preserves the similarity of the members of a particular class and reduces the amount of redundant information. This can be accomplished by identifying a starting point for the pattern and following it, point-by-point, to the end. A continuous pattern is thus represented by discrete points, and the separation of these points is selected to provide the required resolution of curves, angles, etc. When the pattern is followed in this manner, the coordinates of each point are also recorded. The appropriate features (maxima, curvatures, inflection points, etc) are then obtained sequentially and may be presented to a Nestor adaptive module or to multi-layered Nestor adaptive modules connected either in parallel or in series, for classification and recognition purposes. The particular features, or characteristics selected depend upon the recognition strategy.

A specific example of an end point identifier 16 will now be described in reference to FIGS. 4 and 5. It will be understood that other circuits and systems may be substituted for the particular hardwired circuits of FIGS. 4 and 5, and that the circuits of FIGS. 4 and 5 can be modified in various ways to accomplish the same results. It is noted particularly that a programmed general purpose computer, such as a microcomputer and memory, may be substituted as an end point identifier. However, the principles of operation are illustrated by the specific preferred embodiment which will now be described.

Figure 4:
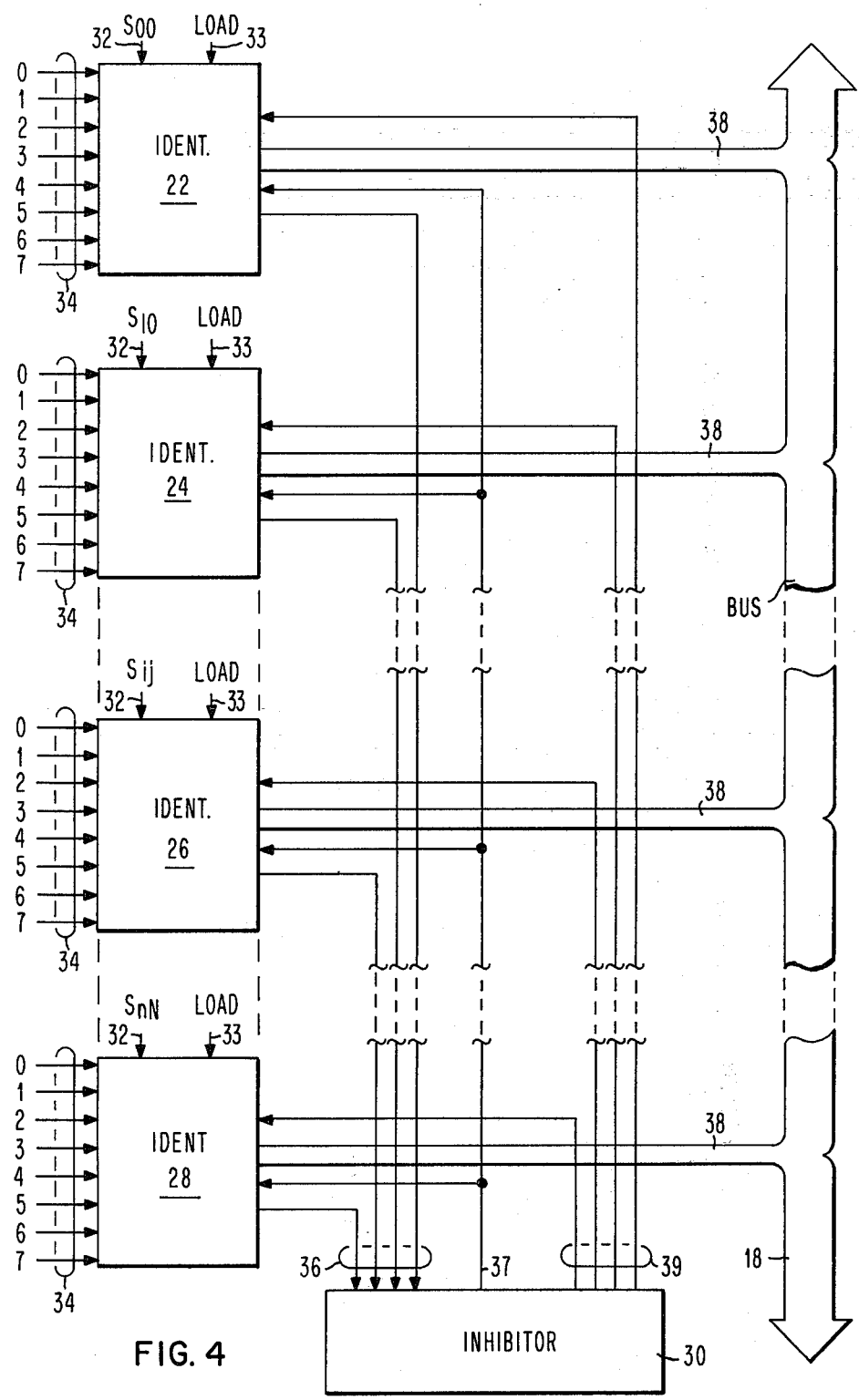
FIG. 4 is a block diagram of the end point identifying and inhibiting device according to a preferred embodiment of the present invention.

FIG. 4 shows the end point identifier circuit 16 in block form. As may be seen, this circuit is divided into two groups or sub-circuits:

(1) Identifier circuits 22, 24, 26 and 28 for each sensor element, and (2) Inhibitor circuit 30 serving all the identifier circuits 22-28.

For the sake of simplicity of understanding, the line to be traced out will be thought of as an illuminated sequence of light sensitive elements on a grid which is otherwise not illuminated. Alternatively, a darkened sequence of light sensitive elements may be provided on an otherwise illuminated grid, and inverted before application to the identifier circuits. Typically, one of the light sensitive elements, designated $a_{ij}$, is exposed to light and sends a signal $S_{ij}$ on line 32 to the respective identifier circuit 26. This signal is strobed in by a signal on the "load" line 33. At the same time, one or more of element $a_{ij}$'s eight neighbors, as shown in FIG. 2, will be exposed to light and will send signals on their respective lines 32 as well as to one or more of the set of eight adjacent lines 34, labelled 0, 1, 2, 3, 4, 5, 6, 7, each of these numbers indicating a connection to the correspondingly numbered neighbor according to FIG. 2. If only one of the $a_{ij}$'s eight neighbors is illuminated, then element $a_{ij}$ is detected as an end (or starting) point of a line. Another possibility for $a_{ij}$ to be a starting point of a line is if any two or three adjacent neighbors, such as 0, 1; 1, 2; 2, 3; or 7, 0, are illuminated. If two or more non-adjacent neighbors are illuminated, then element $a_{ij}$ is detected as a point within the line which is not an end point.

Each of the end point identifiers 22-28 is connected to the inhibitor 30 by individual lines 36. The inhibitor repeatedly scans the lines 36 to determine when an end point is identified. When identification occurs, the inhibitor sends a signal on line 37 to all identifiers to permit the identifier which has just detected an end point to generate parallel output signals representing the coordinates of the light sensitive element to the bus 18 via output wires 38. Thereafter, the inhibitor sends a signal to the respective identifier, which has just identified an end point, over one of its output lines 39 to suppress further end point identification by that identifier.

Figure 5:
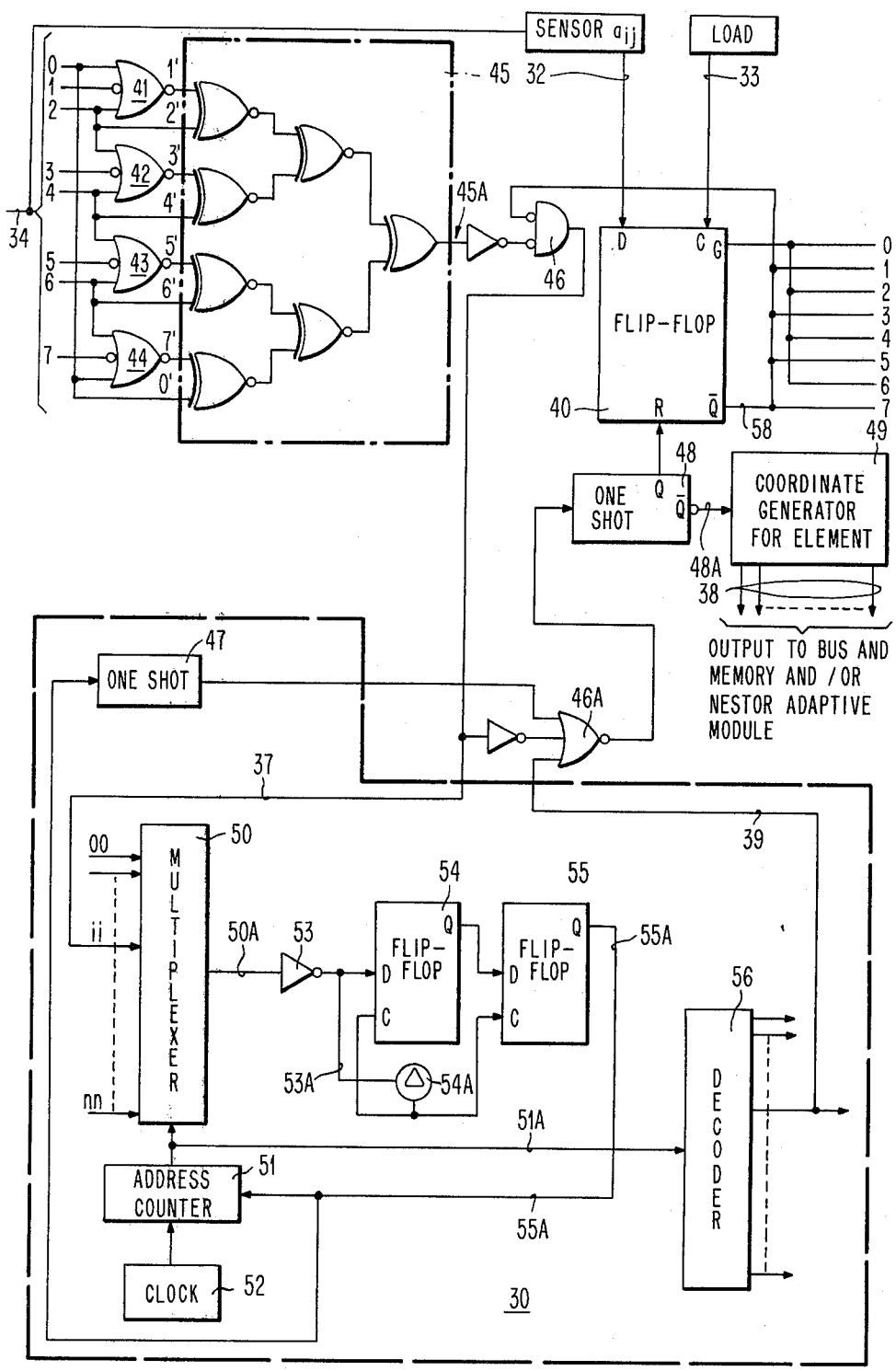
FIG. 5 is a block diagram showing a detail of the device of FIG. 4.

FIG. 5 illustrates in detail one of the identifier circuits 22-28 and the inhibitor circuit 30. The various connections and the operation of these circuits will now be described.

The four NOR gates numbered 41 through 44 in FIG. 5 are connected in the manner shown, so that a signal arriving on any one of the eight lines 34 will produce one output on one of the lines 0' through 7', and likewise only one output on lines 0' through 7' will occur when signals arrive on any two adjacent lines 34. The occurence of such a single output is, therefore, an indication that the sensor element $a_{ij}$ is at an end or starting point of a line. This signal (single output) then passes through the "one and only one" device 45 of exclusive NORs and onto line 45A.

The starting point signal, after inversion, goes to AND gate 46, which also receives the Q ("low") output from flip-flop 40. The output of gate 46 goes onto line 37, as well as, after inversion, to NOR gate 46A, which also receives an output signal from a one shot multivibrator 47. Thus when the one shot signal is "low" and it coincides with the "low" signal from gate 46, the output of the gate 46A is "high". The function of signals arriving at the gate 46A on line 39 is described below.

The "high" output of the gate 46A goes to the one-shot device 48 whose output resets the flip-flop 40 and enables the coordinate generator device 49 via line 48A. Device 49 is hard-wired to bus bars onto which it sends the coordinates of the point $a_{ij}$ via lines 38. The resetting of the flip-flop 40 terminates all the functions associated with the element $a_{ij}$ and signals to its eight neighbors, via lines 57 and 58 (by inverting the outputs Q and Q̄) that the element $a_{ij}$ is no longer functional. The outputs of Q and Q̄ go respectively to the neighbors 1, 3, 5, 7 and 0, 2, 4, 6.

Concurrently with the functions described above, the output of the gate 46 is sent via line 37 to location (ij) of the multiplexer 50. This multiplexer is scanned by an address counter 51 and clock 52. When the scan signal encounters the signal from line 37 at address ij, it passes a signal on line 50A and via an inverter 53 to a flip-flop 54. This signal is also passed via line 53A and a one way switch device 54A to a flip-flop 55. Flip-flops 54 and 55 are of the "master-slave" type and form a shift register. The signal from location ij sets the flip-flop 54 without producing an output from the flip-flop 55. The scanning process by counter 51 and clock 52 continues until the signal from the next end point of the line (from an element $a_{i+k, j+1}$), produced on its line 37 by the same selection process as that for element $a_{ij}$, is encountered by the scanning signal at location (i+k, j+1). This produces a second output on line 50A which proceeds via the inverter 53 to the flip-flop 54, which now, in the usual shift register relation, sets the flip-flop 55 and an output is produced on line 55A, which stops the counter 51 and triggers the one shot device 47. The state (number) of counter 51 is then transmitted via lines 51A to a decoder 56 which sends a "high" signal on line 39 to gate 46A of the element (i+k, j+1) which is a new end point of the line. The "high" signal on line 39 inhibits the gate 46A and prevents the element (i+k, j+1) from assuming the functions of a start or end point. It is noted that the functions of sub-systems 50 and 56 can be accomplished by the same circuit with appropriate gating at the intersections (nodes).

The identification of the sensor element $a_{ij}$ having been inhibited, its nearest neighbor now assumes the function of the starting point, and the procedure continues from point to point, thus following the line and recording the coordinates of its points. This, in turn, permits one to determine any desired features of the line, including but not limited to extrema in any direction, curvature, inflection points, dimensions in any direction, etc.

It should be clear that the embodiment presented here is to be considered as one of many possibilities. As will be obvious to those skilled in the art, other circuit elements, signal polarities and gating procedures, as well as analog circuits or a programmed general purpose digital computer can be used to fulfill the same and related logical functions. Moreover, the sensing elements, exemplified here by light sensitive devices, can obviously be replaced by any other means, such as other optical, magnetic, electrostatic, pressure, temperature, infrared radiation, or any other suitable means of transduction.

It is also noted that raster type scanning of the sensors combined with an appropriate program for computers or microprocessors can be used to accomplish the objectives and functions of the hardware implementation presented here.

We claim:

1. In apparatus for recognizing the existence of a line in a grid-like coordinate system, a method of following the line comprising the steps of: (a) sensing the presence of said line on a grid of spaced and distributed coordinate points within said coordinate system; (b) identifying the coordinate point at an end of said line within said grid; (c) producing a signal representing the identified coordinate point at an end of said line; (d) inhibiting identification of the previously identified coordinate point at an end of said line, thereby defining a new end of said line; and (e) repeating steps (b), (c) and (d); whereby the identified succession of coordinate points specifies the sequential path of said line along the grid from the originally identified end.

2. The method defined in claim 1, wherein said coordinate system is a two dimensional coordinate system.

3. The method defined in claim 2, wherein said coordinate system is a Cartesian coordinate system.

4. The method defined in claim 3, wherein adjacent coordinate points in said grid are spaced by a distance in the range of 0.1-1 mm.

5. The method defined in claim 4, wherein said adjacent coordinate points are spaced by approximately 0.5 mm.

6. The method defined in claim 1, wherein said line has two ends and said identifying step includes the step of selecting one of said ends as the original end point of said line, thereby defining a starting point of said line.

7. The method defined in claim 1, wherein said identifying step includes the step of determining whether adjacent coordinate points on said line are adjacent to each other.

8. The method defined in claim 1, further comprising the step of recording a representation of the successively inhibited coordinate points in a memory.

9. The method defined in claim 1, further comprising the step of passing signals representative of the successively inhibited coordinate points to a Nestor adaptive module.

10. Curve follower apparatus for determining the coordinate points, in succession, along a line arranged within a prescribed coordinate system having a grid of spaced and distributed coordinate points, said apparatus comprising: (a) sensor means, for determining the presence of said line at said coordinate points; (b) means, responsive to said sensor means, for repeatedly identifying the coordinate points at an end of said line; and (c) means, connected to said coordinate point identifying means, for repeatedly inhibiting identification of the previously identified coordinate point at an end of said line, thereby defining a new end of said line; whereby the succession of inhibited coordinate points specifies the sequential path of said line along the grid from the originally identified end.

11. The apparatus defined in claim 10, wherein said sensor means includes a plurality of photocells, each photocell being arranged at one of said coordinate points.

12. The apparatus defined in claim 10, wherein said sensor means includes means for producing a plurality of first signals, each first signal associated with one coordinate point and indicating the presence of said line at said one coordinate point.

13. The apparatus defined in claim 12, wherein said identifying means includes a plurality of means, each associated with one coordinate point and responsive to those of said first signals also associated with said one coordinate point and with the coordinate points immediately adjacent thereto, for producing a second signal identifying said one coordinate point as being situated at the end of said line if:
 (a) the first signal associated with said one coordinate point indicates the presence of said line at that point;
 (b) the first signals associated with said adjacent coordinate points indicate the presence of said line at only coordinate points which are themselves adjacent to each other.

14. The apparatus defined in claim 13, wherein said inhibiting means includes means, responsive to the identification of an end point by one of said second signal producing means, for producing a third signal when an end point has been identified, said one second signal producing means terminating the production of said second signal upon receipt of said third signal.

15. The apparatus defined in claim 10, wherein said line has two ends and said identifying means includes means for selecting one of said ends as the original end point of said line, thereby defining a starting point of said line.

16. The apparatus defined in claim 10, wherein said identifying means include means for determined whether adjacent coordinate points on said line are adjacent to each other.

17. The apparatus defined in claim 10, further comprising memory means for recording a representation of the successively inhibited coordinate points.

18. The apparatus defined in claim 10, further comprising means for producing signals representing the successively inhibited coordinate points in sequential order.

19. The apparatus defined in claim 18, further comprising means for passing signals representing the successively inhibited coordinate points to a Nestor adaptive module.

20. The apparatus defined in claim 18, wherein said apparatus includes one output wire per identifiable coordinate point, such that a signal appearing on one wire represents one coordinate point.

21. The apparatus defined in claim 18, wherein said apparatus includes a plurality of output wires, a plurality of signals appearing simultaneously on said output wires representing, in encoded form, a coordinate point.

22. The apparatus defined in claim 10, wherein said sensor means include a plurality of light sensitive elements.

23. The apparatus defined in claim 10, wherein said coordinate system is a two dimensional coordinate system.

24. The apparatus defined in clain 23, wherein said coordinate system is a Cartesian coordinate system.

25. The apparatus defined in claim 24, wherein adjacent coordinate points in said grid are spaced by a distance in the range of 0.1–1 mm.

26. The apparatus defined in claim 25, wherein said adjacent coordinate points are spaced by approximately 0.5 mm.

* * * * *